Nov. 6, 1923.
G. H. DOERING
ARTIFICIAL BAIT
Filed Feb. 28, 1921
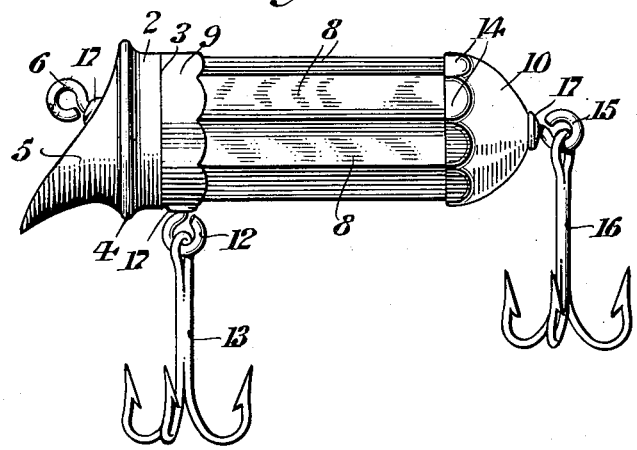
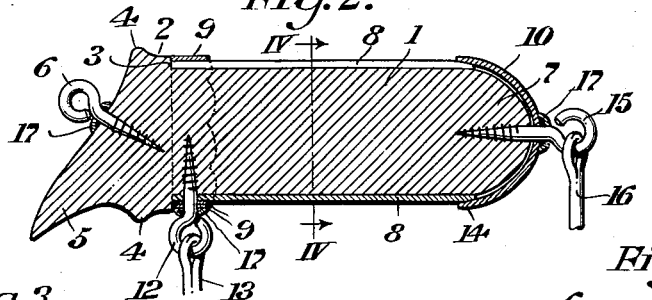
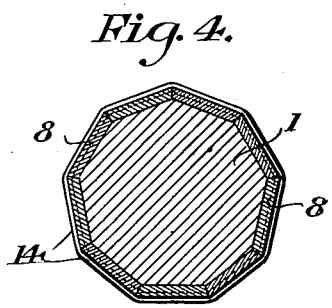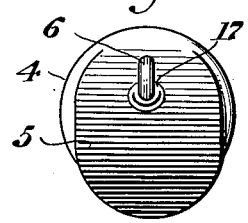
Inventor
George H. Doering
By
his Attorneys Patented Nov. 6, 1923.

1,473,420

UNITED STATES PATENT OFFICE.

GEORGE H. DOERING, OF BROOKLYN, NEW YORK.

ARTIFICIAL BAIT.

Application filed February 28, 1921. Serial No. 448,496.

*To all whom it may concern:*

Be it known that I, GEORGE H. DOERING, a citizen of the United States, and resident of the borough of Brooklyn, in the county of Kings, city and State of New York, have invented certain new and useful Improvements in Artificial Baits, of which the following is a specification.

This invention relates to improvements in artificial bait, and has for its principal object to provide means for increasing the fish-attracting qualities of artificial casting or trolling baits.

Another important object of the invention is to provide an artificial bait having a colored body portion which will not be marred in handling the bait or by fish striking the bait.

Another object of the invention is to provide an artificial bait having sections or strips of practically indestructible permanently colored material secured thereto.

Further objects of the invention are to provide an artificial bait which will float when at rest and submerge when retrieved; to improve the diving qualities of the bait; to increase the ease with which the bait may be retrieved; to cause the formation of a decided wake during retrieving of the bait; and to impart a sinuous, wriggling and darting movement to the bait during retrieving thereof.

In the drawings:

Figure 1 is a side elevation of the bait;

Fig. 2 a central longitudinal sectional view thereof;

Fig. 3 a detail view of one of the pearl panel retaining devices;

Fig. 4 a section on the line IV—IV of Fig. 2; and

Fig. 5 an end view of the bait.

The main body portion 1 of the bait is preferably formed of wood and is preferably of polygonal form in cross section through the major portion of its length. The wooden body has sufficient bulk to sustain itself, and the attached parts hereinafter described, upon the surface of the water when the bait is at rest. The body 1 is formed with a cylindrical head portion 2 of slightly greater diameter than the polygonal portion of the body so as to form a shoulder 3 at the forward end of the polygonal portion of the body.

The head 2 is provided with a circumferential flange or rib 4 and with a forwardly and downwardly extending diving nose 5 forward of said flange 4. The lower surface of the diving nose is rounded in cross section and in side view curves forwardly and downwardly to a point materially below the lower edge of the main body portion of the bait. The front face of the diving nose extends in a reverse curve from the tip of the nose to the flange 4 at a point approximately on a line with the upper edge of the body. A screw eye 6 is screwed into the front curved face of the diving nose 5, the projecting end of the screw eye to which the line is adapted to be attached being located above the longitudinal center line of the bait body. The rear end of the bait body is preferably rounded as shown at 7.

A plurality of strips or panels 8 of mother of pearl are secured to the polygonal portion 1 of the wooden bait body, there being preferably one integral panel overlying each flat surface of the body portion 1, as shown. The longitudinal edges of the pearl panels 8 are beveled so that the panels will fit snugly together and form a continuous, polygonal, multicolored, and iridescent sheath for the body portion 1. These panels may be held to the wooden body in various ways, but I prefer to employ the means shown which embodies a clamping or retaining ring 9 and a retaining cap 10.

The ring or band 9 is split or divided and its overlapped end portions are provided with registering apertures 11 through which the shank of the forward gang-hook-attaching screw-eye 12 passes. Screw-eye 12 passes also through an aperture in the lowermost pearl panel 8 and is screwed upward into the wooden body of the bait. A gang hook 13 is attached to screw-eye 12 which thus serves to lock both the band 9 and hook 13 to the bait body. Band 9 is preferably bent transversely at the meeting edges of each two panels 8 so as to lie flat against the panels, and its rear edge is preferably scalloped as shown.

The cap 10 fits over the tapered or rounded rear end portion 7 of the wooden bait body and has its rim portion pressed into polygonal form as shown at 14 so as to snugly embrace the rear ends of the panels 8. The rear ends of the panels may be slightly beveled as shown to insure a firm gripping contact between the cap and panels. The cap is forced forwardly about the rear end of the bait body and securely held in place by a screw-eye 15 which also serves as a means for attaching a rear gang hook 16 to the bait body. Band 9 and cap 10 are formed of light sheet metal, preferably thin gauge aluminum. Each screw-eye is preferably provided with the usual cup-shaped metal washer 17.

The mother of pearl sheath or covering forms a highly attractive and efficient fish lure owing to its multi-colored and iridescent character. It is also practically indestructible as it is not affected by water and its fish luring qualities cannot be destroyed by handling or by fish striking the bait as is the case with painted bait bodies. If the pearl should be badly scratched by a fish or by one of the hooks, its colored and iridescent surface can be easily and completely restored by rubbing a finger a few times over the scratched surface.

The collar, flange or rib 4 produces a decided wake when the bait is pulled through the water which materially aids in attracting fish to the bait. The reverse curve of nose 5 causes the bait to quickly and easily submerge when the bait is pulled forward and reduces head resistance to a minimum. The location of screw eye 6 above the longitudinal center line of the body and considerably to the rear of the forward end of nose 5 facilitates the diving action when the bait is retrieved and also causes the bait to have a sinuous, darting or wriggling motion when retrieved. The darting motion of the bait is due primarily to the projection of the nose forward of the point at which the line is attached to the bait, and is highly advantageous as it simulates the swimming movement of a minnow.

It will be obvious that various materials may be substituted for mother of pearl, or panels of pearls may be used in combination with panels of other material of various colors. For example I may form all or some of the panels of bakelite, natural or artificial ivory, celluloid, or other materials which may be colored as desired. The sheath may be formed in panels, as shown, or of one piece. It will be observed that all or a part of the sheath may be replaced or changed when necessary or desired. While I have shown the detachable fish-attracting bait-covering applied to a floating and diving bait having a wooden body, it will be obvious that it may be applied to various other types of floating or non-floating baits having bodies made of various materials and of various shapes.

What I claim is:

1. A fish bait comprising a body portion, a plurality of strips of hard and insoluble fish-attracting material extending longitudinally of the body portion, a divided band embracing said strips adjacent one end, a fastening device extending through the overlapped ends of the band into the body portion, a cap fitting over one end of the body and embracing the other ends of the strips, and a fastening device extending through the cap into the adjacent end of the body.

2. A fish bait comprising a body portion, a series of strips of fish-attracting material extending longitudinally of the body portion, a band extending around the body portion over said strips adjacent one end of the series of strips, a screw eye passing through the band and threaded into the body, a cap fitting over one end of the body and embracing the adjacent ends of the strips, a screw eye extending through the cap and threaded into the body, and hooks attached to both of said screw-eyes.

3. A fish bait of the plug type comprising a body provided with means for imparting a wriggling motion thereto when drawn through the water, said body having angularly disposed iridescent surfaces.

4. A fish-bait comprising a plug body formed with a circumferential shoulder adjacent its forward end, a plurality of longitudinally extending strips of colored material arranged edge to edge around the body and abutting said shoulder at their forward ends, an annular retainer embracing the forward ends of the strips, and a cap on the rear end of the body embracing the rear ends of the strips.

5. A fish-bait comprising a plug body formed with a circumferential shoulder adjacent its forward end, a plurality of strips of colored material extending longitudinally of the body and abutting said shoulder at their forward ends, the rear ends of said strips being beveled, an annular retainer embracing the forward ends of the strips, and a cap secured to the rear end of the body and embracing the rear beveled ends of the strips.

6. A fish-bait of the plug type having a portion of its body of polygonal form in transverse section, a series of flat angularly disposed strips of iridescent material arranged around the exterior of the bait on the flat faces of said polygonal body portion, a pair of retaining members embracing opposite ends of the series of strips, and removable fastening devices extending through said retaining members into the body for detachably holding the members and strips to the body.

7. A fish-bait comprising a flotative plug having a main body portion of polygonal cross-section, a polygonal series of flat strips of mother of pearl arranged around the exterior of the plug on the flat faces of said polygonal body portion, and a pair of retaining members embracing the opposite ends of the series of strips.

8. A fish-bait comprising a flotative plug having a main body portion of polygonal form and a forwardly and downwardly extending nose, flat strips of mother of pearl, and means for holding said flat strips to the flat faces of the polygonal body portion of the plug.

In testimony whereof I hereunto affix my signature.

GEORGE H. DOERING.